United States Patent
Kutsuzawa

(10) Patent No.: US 8,487,068 B2
(45) Date of Patent: Jul. 16, 2013

(54) METHOD OF MANUFACTURING POLYBENZOXAZOLE PRECURSOR

(75) Inventor: Naoya Kutsuzawa, Yokosuka (JP)

(73) Assignee: Toho Chemical Industry Co., Ltd., Tokyo (JP)

( * ) Notice: Subject to any disclaimer, the term of this patent is extended or adjusted under 35 U.S.C. 154(b) by 0 days.

(21) Appl. No.: 13/599,074

(22) Filed: Aug. 30, 2012

(65) Prior Publication Data

US 2013/0059985 A1    Mar. 7, 2013

(30) Foreign Application Priority Data

Aug. 31, 2011  (JP) ................................. 2011-190080

(51) Int. Cl.
*C08G 63/00*  (2006.01)
*C08G 63/02*  (2006.01)

(52) U.S. Cl.
USPC ............ 528/210; 528/176; 528/190; 528/193

(58) Field of Classification Search
USPC .................................. 528/176, 190, 193, 210
See application file for complete search history.

(56) References Cited

FOREIGN PATENT DOCUMENTS

JP         2007-106786 A      4/2007

*Primary Examiner* — Terressa Boykin
(74) *Attorney, Agent, or Firm* — Fox Rothschild LLP; Peter J. Butch, III

(57) ABSTRACT

The present invention provides a method for producing a polybenzoxazole precursor having reduced contents of residual aprotic polar solvent and residual halogen without discharging a large amount of waste water during purification. The present invention specifically relates to a method for producing a polybenzoxazole precursor, which comprises synthesizing a polybenzoxazole precursor in an aprotic polar solvent, adding and mixing water and a water-insoluble solvent with the resulting polybenzoxazole precursor solution to still stand the solution, and then separating a water layer from the solution to reduce a content of impurities remaining in the polybenzoxazole precursor.

6 Claims, No Drawings

METHOD OF MANUFACTURING POLYBENZOXAZOLE PRECURSOR

BACKGROUND

1. Technical Field

The present invention relates to a method for producing of a polybenzoxazole precursor, which uses a water-insoluble solvent and water for extraction in purification of a polybenzoxazole precursor, thereby reducing impurities such as residual halogen and residual aprotic polar solvent, and the like.

2. Description of Related Art

Polybenzoxazoles possess superior properties such as high heat resistance and mechanical characteristics, because of its rigid main chain structure like polyimide resins, and therefore are a material that can be applied to various electronic devices. A polybenzoxazole precursor has been attracted attention because it has a phenolic hydroxy group in its structural unit and can easily form a clear fine positive pattern by alkali development when being combined with a diazonaphthoquinone compound.

As a method for synthesizing a polybenzoxazole precursor is cited a method which comprises reacting aromatic dicarboxylic acid dihalide and bis(o-aminophenol) in an aprotic polar solvent. This synthesis method, however, necessarily allows a large amount of halogen component to remain in a polymerization solution. Therefore, particularly when the resultant polybenzoxazole is used for an electronic material, such residual halogen must be completely removed because it may cause serious problems for electronic wiring.

Although a method in which a treatment of washing a polybenzoxazole precursor with pure water or an alcohol is repeated has been commonly used, it has been difficult to completely remove residual halogen in the polybenzoxazole precursor. Japanese Patent Application Laid-Open No. 2007-106786 discloses a method which comprises dropping a polybenzoxazole precursor solution into water and then performing water washing treatment and aqueous alkali solution washing treatment. This method, however, induces generation of a large amount of waste water. Moreover, since an aprotic polar solvent to be used as a solvent for synthesis strongly associates with a solute polybenzoxazole precursor, it is difficult to remove residual aprotic polar solvent, leading to some problems, for example, a problem that a uniform film cannot be obtained in molding or coating.

SUMMARY

The problem to be solved by the present invention is to provide a method for producing a polybenzoxazole precursor which can reduce impurities such as residual aprotic polar solvent and residual halogen without discharging a large amount of waste water during purification.

As a result of earnest studies made for solving the above-described problem, the present inventor has found a production method which can easily reduce a content of an aprotic polar solvent and halogen remaining in a polybenzoxazole by adding and mixing water and a water-insoluble solvent with a polymerization liquid in an aprotic polar solvent of a polybenzoxazole precursor obtained by reacting bis(o-aminophenol) and dicarboxylic acid dihalide to still stand the solution, separating a water layer, and then repeated washing with pure water.

Specifically, the present invention relates to a method for producing a polybenzoxazole precursor, which comprises synthesizing a polybenzoxazole precursor in an aprotic polar solvent, adding and mixing water and a water-insoluble solvent with the resulting polybenzoxazole precursor solution to still stand the solution, and then separating a water layer from the solution to reduce a content of impurities remaining in the polybenzoxazole precursor.

The present invention also relates to a polybenzoxazole obtained by subjecting a polybenzoxazole precursor purified by the production method to ring closure reaction by thermal dehydration.

The present invention relates also to a polybenzoxazole precursor obtained in the presence of an aprotic polar solvent, wherein a content of the aprotic polar solvent is reduced to 0.5% by mass or less relative to 100% by mass of the polybenzoxazole precursor.

According to the present invention, a polybenzoxazole precursor solution having reduced contents of residual aprotic polar solvent and residual halogen can be obtained. Moreover, an amount of waste water generated during purification can be reduced.

DETAILED DESCRIPTION

An embodiment of the present invention will be typically described below.

As a raw material of a polybenzoxazole precursor, monomers, bis(o-aminophenol) represented by the following formula (1) and dicarboxylic acid dihalide represented by the following formula (2) are usually used.

Formula (1)

wherein $R_1$ represents a tetravalent aromatic group,

Formula (2)

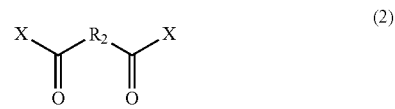

wherein $R_2$ represents a divalent aromatic group, a divalent aliphatic group, or a divalent linking group, and X represents a halogen atom.

In the formula (1), $R_1$ represents a tetravalent aromatic group, and includes those represented by the following formula (3).

Formula (3)

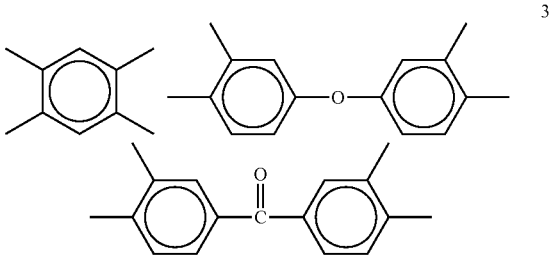

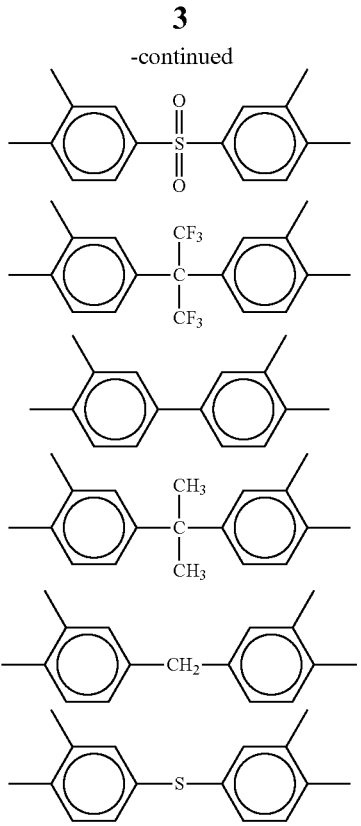

The bis(o-aminophenol) includes, but is not limited to, 3,3'-dihydroxybiphenyl, 3,3'-diamino-4,4'-dihydroxydiphenyl ether, 4,4'-diamino-3,3'-dihydroxydiphenyl ether, 3,3'-diamino-4,4'-dihydroxydiphenylsulfone, 4,4'-diamino-3,3'-dihydroxydiphenylsulfone, 3,3'-diamino-4,4'-dihydroxydiphenylmethane, 4,4'-diamino-3,3'-dihydroxydiphenylmethane, 2,2-bis(3-amino-4-hydroxyphenyl)-propane, 2,2-bis(3-amino-4-hydroxyphenyl)hexafluoropropane, 4,6-diaminoresorcinol, 2,5-diaminohydroquinone, and 3,3'-dihydroxybenzidine. These may be used singly or two or more of them may be used in combination.

In the formula (2), $R_2$ represents a divalent aromatic group, a divalent aliphatic group, or a divalent linking group. The divalent aromatic group includes those represented the following formula (4):

Formula (4)

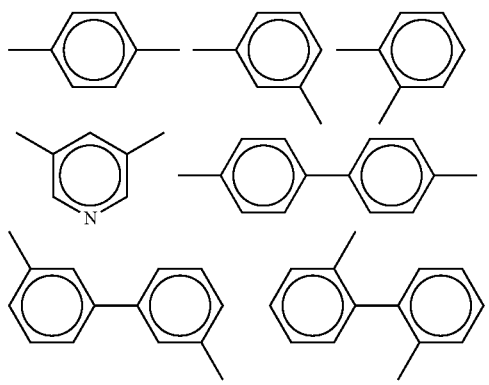

(4)

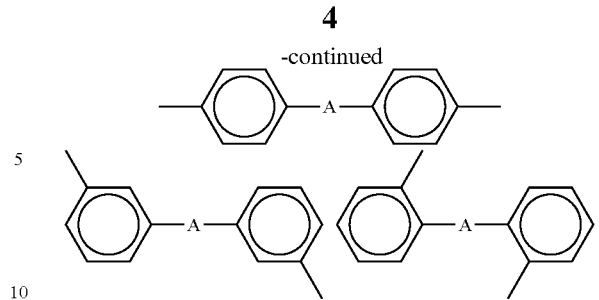

wherein A represents a divalent group selected from the group consisting of —$CH_2$—, —O—, —S—, —$SO_2$—, —CO—, —NHCO—, and —$C(CF_3)_2$—.

The divalent aliphatic group includes linear or branched aliphatic groups having 1 to 20 carbon atoms or alicyclic groups.

As the halogen atom, a bromine atom may be chosen, as well as a chlorine atom. A chlorine atom is preferable because of more freedom of choice of materials.

The dicarboxylic acid dihalide which can be used herein includes, but is not limited to, dihalides of dicarboxylic acids such as isophthalic acid, terephthalic acid, 2,5-dimethylterephthalic acid, 2,3-pyridinedicarboxylic acid, 2,4-pyridinedicarboxylic acid, 2,6-pyridinedicarboxylic acid, 3,4-pyridinedicarboxylic acid, 3,4-pyridinedicarboxylic acid, 3,5-pyridinedicarboxylic acid, 4,4'-diphenylether dicarboxylic acid, 4,4'-biphenyldicarboxylic acid, 2,2'-biphenyldicarboxylic acid, 4,4'-diphenylmethanedicarboxylic acid, 4,4'-diphenylsulfonedicarboxylic acid, 1,2-naphthalenedicarboxylic acid, 1,4-naphthalenedicarboxylic acid, 1,5-naphthalenedicarboxylic acid, 2,3-naphthalenedicarboxylic acid, 2,6-naphthalenedicarboxylic acid, 2,7-naphthalenecarboxylic acid, 1,3-adamantanedicarboxylic acid, 1,8-anthracenedicarboxylic acid, oxalic acid, malonic acid, succinic acid, glutaric acid, adipic acid, pimelic acid, suberic acid, azelaic acid, sebacic acid, maleic acid, fumaric acid, 1,2-cyclohexanedicarboxylic acid, 1,3-cyclohexanedicarboxylic acid, and 1,4-cyclohexanedicarboxylic acid. These may be used singly or two or more of them may be used in combination.

In the method for producing of a polybenzoxazole precursor of the present invention, a monoamine may be used in order to block a terminal of a polymer molecule. Examples of the monoamine include aniline, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-aminobenzaldehyde, m-benzaldehyde, p-benzaldehyde, 2-aminophenyl ether, 3-aminophenyl ether, and 4-aminophenyl ether. These may be used solely or as a mixture of two or more of them.

Although the aprotic polar solvent to be used for the polymerization reaction is not particularly restricted, for example, amide solvents, such as N,N-dimethylformamide (DMF), N,N-dimethylacetamide (DMAc), and N-methyl-2-pyrrolidone (NMP); cyclic ester solvents, such as γ-butyrolactone, γ-valerolactone, and γ-caprolactone, acetophenone, and dimethyl sulfoxide (DMSO) are suitably cited. In addition, other common organic solvents may be added.

For the synthesis of a polybenzoxazole precursor, methods which have commonly used can be used. For example, bis(o-aminophenol) is dissolved in an aprotic polar solvent. Then, dicarboxylic acid dihalide in a powdery form, a liquid form, or in the form of a solution prepared by being dissolved in a polymerization solution is added thereto, followed by stirring for 30 minutes to 48 hours, to prepare a polymerization liquid.

The polymerization reaction is preferably carried out while a concentration of the solute is adjusted within the range of 1 to 50% by weight. In view of inhibiting a side reaction and a step of filtering precipitates, the reaction is carried out more preferably with the concentration adjusted within the range of 5 to 30% by weight.

The polymerization temperature is preferably −50 to 150° C., and more preferably 20 to 100° C. If the polymerization temperature is lower than −50° C., the reaction would progress very slowly, whereas if it exceeds 150° C., precipitates would undesirably tend to be formed due to decreased solubility by cyclization reaction of a part of the polybenzoxazole precursor to be obtained.

In the purification step, a water-insoluble solvent and water are added to the solution of polybenzoxazole precursor in aprotic polar solvent, then mixed by stirring or the like, and thereafter stands still until being separated into two layers. Then, a water layer is removed. By repeating any number of times an operation including adding water, mixing, standing still, and then separating a water layer, the polybenzoxazole precursor solution can be purified.

The water-insoluble solvent to be used in the purification step in the present invention is not particularly restricted as long as it can dissolve a polybenzoxazole precursor and is insoluble in water. As the examples thereof, ester solvents, such as methyl formate, ethyl formate, propyl formate, butyl formate, isobutyl formate, pentyl formate, methyl acetate, ethyl acetate, propyl acetate, isopropyl acetate, butyl acetate, isobutyl acetate, and sec-butyl acetate; ether solvents, such as diethyl ether, ethyl methyl ether, methyl isopropyl ether, methyl tert-butyl ether (MTBE), tetrahydrofuran (THF), and dioxane; and ketone solvents, such as methyl isopropyl ketone, diisopropyl ketone, methyl isobutyl ketone (MIBK), diisobutyl ketone, cyclopentanone, and cyclohexanone, can be used. Depending upon a state of a final product, it is generally preferable to use a water-insoluble solvent that has a low boiling point and that azeotropes with water.

A solubility of water-insoluble solvent in water is preferably up to 30 g/100 ml. The solubility is more preferably up to 10 g/100 ml, and even more preferably up to 3 g/100 ml.

An amount of water-insoluble solvent to be used is preferably 0.5 to 5.0 times by weight the polybenzoxazole precursor solution. From the viewpoint of cost and purification efficiency, the amount is more preferably 0.8 to 2.0 times by weight, and even more preferably 1.0 to 1.5 times by weight.

An amount of water to be used in the purification is preferably 0.5 to 5.0 times by weight the polybenzoxazole precursor solution. From the viewpoint of cost and purification efficiency, the amount is more preferably 0.5 to 2.0 times by weight, and even more preferably 0.5 to 1.2 times by weight.

A purification temperature is only required to be not lower than a boiling point of the solvent or water used and not lower than a freezing point thereof. The temperature is preferably 20 to 50° C. from the viewpoint that it can prevent generation of emulsion.

Methanol, alkali, and so on may be added to the water to be used for the purification to an extent that the effects by the present invention are not impaired thereby.

A content of aprotic polar solvent in the purified solution is preferably up to 1% by mass, more preferably up to 0.5% by mass, even more preferably up to 0.3% by mass, and particularly preferably up to 0.1% by mass, relative to 100% by mass of the polybenzoxazole precursor.

A content of halogen in the purified solution is preferably up to 10 ppm, more preferably up to 5 ppm, and even more preferably up to 1 ppm, relative to 100% by mass of the polybenzoxazole precursor.

As a method for forming a polybenzoxazole from a polybenzoxazole precursor, a method which comprises replacing a precursor solution, if necessary, with another solvent, casting the solution onto a glass plate or another substrate, and then heating the casted substance to remove the solvent, and heating it to about 200° C. to 500° C. to form a benzoxazole ring, thereby obtaining a polybenzoxazole. A heating time, which may be varied depending on heating temperature, is about 10 minutes to about 5 hours. In this case, an atmosphere may be replaced with an inert gas, such as nitrogen and argon. The resultant polybenzoxazole may be removed from the substrate and used in the form of an isolated film, or may be used as a coating film disposed on the substrate. Alternatively, a precursor is first isolated by optionally replacing a precursor solution, if necessary, with another solvent, pouring the solution into a poor solvent of the precursor, such as water and methanol, to form a precipitate of precursor, and then collecting by filtration and drying, or by removing the solvent from the precursor solution under reduced pressure. Then, the isolated precursor is processed into a powdery form or another prescribed form, and then subjected to heat treatment to form a benzoxazole ring, thereby yielding a polybenzoxazole.

EXAMPLES

The present invention will be described in detail below with reference to Examples, to which the present invention is not limited. In the Examples, "%" means "% by mass" unless otherwise stated.

In the Examples, an content of residual aprotic polar solvent was determined by gas chromatography (GC). An amount of by-product ion species was determined by ion chromatography (IC).

(Measurement of Content of Aprotic Polar Solvent)

The content of an aprotic polar solvent was measured by dissolving a polybenzoxazole precursor or a solution thereof in acetone to prepare a sample, and subject the sample to gas-chromatography.

<Measurement Conditions>

Instrument: GC-2010 manufactured by Shimadzu Corporation

Column: DB-WAX (30 m×0.25×0.25)

Column temperature: 50° C. (retention time: 5 min)→15° C./min→220° C. (retention time: 0)

(Measurement of Content of Chloride Ion)

The content of chloride ion was measured by extracting chloride ion remaining in a polybenzoxazole precursor or a solution thereof into water to prepare a sample, and subject the sample to ion-chromatography.

<Measurement Conditions>

Instrument: DX-320J AS50 manufactured by DIONEX

Eluate: an aqueous 2.7 mM $Na_2CO_3$/0.3 mM $NaHCO_3$ solution

Example 1

Into a 5-necked 300-ml flask which had been fully dried under nitrogen, 18.31 g (0.05 mol) of 2,2-bis(3-amino-4-hydroxyphenyl)hexafluoropropane was placed. Then, 66.4 g of N-methyl-2-pyrrolidone was added thereto and the monomer was dissolved therein using a stirrer. To the solution was added slowly 10.15 g (0.05 mol) of terephthaloyl dichloride, and then polymerization reaction was carried out at room temperature under nitrogen atmosphere for several hours, to yield a polybenzoxazole precursor solution. The resultant solution was transferred to a 500-ml separatory funnel, to which 142.3 g of methyl isobutyl ketone was added and uniformly mixed, and then 95 g of water was further added and mixed. After standing the solution to separate into an organic layer and a water layer, the bottom layer was removed away, and 95 g of water was added to wash. This operation was repeated 7 times, to obtain 162.2 g (polymer content: 17.1%, yield: 95.2%) of a polybenzoxazole precursor solution. A content of N-methyl-2-pyrrolidone in the purified solution was 0.059% relative to 100% by mass of the polybenzoxazole precursor. A concentration of chloride ion was 0.67 ppm in terms of a content in 100% by mass of the polybenzoxazole precursor.

Example 2

A polymerization liquid was prepared in the same manner as in Example 1, and then impurities were washed in the same manner as in Example 1 except that ethyl acetate was used as a water-insoluble solvent instead of methyl isobutyl ketone. An amount of the polybenzoxazole precursor solution obtained by repeating the operation 9 times was 115.2 g (polymer content: 20.3%, yield: 88.1%). A content of N-methyl-2-pyrrolidone in the purified solution was 0.011% relative to 100% by mass of the polybenzoxazole precursor. A concentration of chloride ion was 5.53 ppm in terms of a content in 100% by mass of the polybenzoxazole precursor.

Comparative Example 1

A polymerization liquid was prepared in the same manner as in Example 1. The resultant polymerization liquid was dropped into 948.8 g of water, to form a precipitate of polybenzoxazole precursor. The precipitate of polybenzoxazole precursor was then added to 948.8 g of water and stirred to wash. After the washing was repeated 5 times, the residue was dried by heating at 50° C. under reduced pressure in a vacuum dryer, to obtain 21.9 g (yield: 81%) of polybenzoxazole precursor. A content of N-methyl-2-pyrrolidone in the purified solution was 2% relative to 100% by mass of the polybenzoxazole precursor. A concentration of chloride ion was 8 ppm in terms of a content in 100% by mass of the polybenzoxazole precursor.

In each of the purifications in Examples 1 and 2 and Comparative Example 1, ratios (fold) of the amounts of methyl ethyl ketone and water used to the amount of the polymerization liquid, i.e., the total mass of the polybenzoxazole precursor and the N-methyl-2-pyrrolidone are as follows.

TABLE 1

|  | Solvent used in purification | Total amount of water used in purification |
|---|---|---|
| Example 1 | 1.5 | 7.5 |
| Example 2 | 1.5 | 7.5 |
| Comparative Example 1 | 0 | 50.0 |

From the contents of remaining impurities and the amounts of solvent and water used in the purification, it is noted that the purification effect is higher and the amount of waste water can be reduced more in Examples 1 and 2, in which purification by extraction was performed, than in Comparative Example 1.

Moreover, it also is noted from the yield of polybenzoxazole precursor actually recovered that loss was less in Examples 1 and 2, which is very advantageous for industrialization. Further, it is considered that influence of static electricity and so on is exhibited more easily in the form of powder, and that it is easier to handle in the form of a solution.

The method of the present invention can be used suitably as a method for producing a polybenzoxazole precursor, which can be used for an electrically insulating film and the like in various electronic devices, because of its excellent heat resistance, dimensional stability, insulation performance, and heat resistance against solder.

The present application is based on Japanese Patent Application No. 2011-190080 filed on Aug. 31, 2011, the disclosure thereof is incorporated herein in entirety by reference.

What is claimed is:

1. A method for producing a polybenzoxazole precursor, which comprises synthesizing a polybenzoxazole precursor in an aprotic polar solvent, adding and mixing water and a water-insoluble solvent with the resulting polybenzoxazole precursor solution to still stand the solution, and then separating a water layer from the solution to reduce a content of impurities remaining in the polybenzoxazole precursor.

2. The method for producing of a polybenzoxazole precursor according to claim 1, wherein the polybenzoxazole precursor is prepared by reacting bis(o-aminophenol) represented by the following formula (1) and dicarboxylic acid dihalide represented by the following formula (2) as essential components:

wherein $R_1$ represents a tetravalent aromatic group:

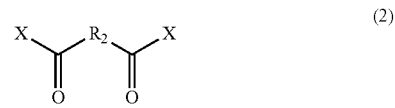

wherein $R_2$ represents a divalent aromatic group, a divalent aliphatic group, or a divalent linking group, and X represents a halogen atom.

3. The method for producing of a polybenzoxazole precursor according to claim 1, wherein the aprotic polar solvent is N-methyl-2-pyrrolidone (NMP).

4. The method for producing of a polybenzoxazole precursor according to claim 1, wherein the water-insoluble solvent is a water-insoluble ketone solvent.

5. A polybenzoxazole obtained by subjecting a polybenzoxazole precursor purified by the method set forth in claim 1 to ring closure reaction by thermal dehydration.

6. A polybenzoxazole precursor obtained in the presence of an aprotic polar solvent, wherein a content of the aprotic polar solvent is reduced to 0.5% by mass or less relative to 100% by mass of the polybenzoxazole precursor.

* * * * *